United States Patent Office 3,332,959
Patented July 25, 1967

3,332,959
4,4′-BIPYRIDYLIUM QUATERNARY SALTS
John Theodore Braunholtz, Bracknell, England, assignor to Imperial Chemical Industries Limited, London, England, a corporation of Great Britain
No Drawing. Filed Dec. 13, 1962, Ser. No. 244,290
Claims priority, application Great Britain, Dec. 20, 1961, 45,646/61
6 Claims. (Cl. 260—296)

This invention relates to 4,4′-bipyridylium quaternary salts, to processes for their preparation and to their use as herbicides.

The invention consists in one aspect of 4,4′-bipyridylium quaternary salts having attached to one of the nitrogen atoms of the 4,4′-bipyridyl nucleus an unsubstituted or substituted aliphatic radical and attached to the other nitrogen atom of the 4,4′-bipyridyl nucleus a substituted aliphatic radical, provided that where the two aliphatic radicals are both substituted radicals the substituted radicals are different from each other. The bipyridylium quaternary salts can be, for example, compounds of the formula:

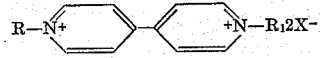

where R is an aliphatic radical of 1–4 carbon atoms, optionally substituted, $R_1$ is an aliphatic radical of 1–4 carbon atoms having a substituent, and $X^-$ is an anion.

Compounds which have been found to have particularly interesting herbicidal properties are those in which one of the nitrogen atoms of the bipyridyl nucleus has a methyl radical as substituent, for instance compounds of the formula:

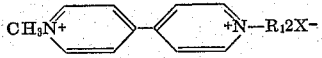

where $R_1$ is a substituted alkyl radical, for instance methyl, and $X^-$ is an anion.

The substituents in the aliphatic radicals referred to above can be, for instance, chosen from the following: hydroxyl, halogen, carboxyl, alkoxy, carboalkoxy, carbamyl, N - substituted carbamyl, amino, substituted amino, phenyl and substituted phenyl. Thus, $R_1$ in the formula shown immediately above can be an ethoxycarbonylalkyl, hydroxyalkyl, acetonyl or carbamoylalkyl radical.

Compounds which have been found to possess good herbicidal activity are the following:

1-methyl-1′-(β-hydroxyethyl)-4,4′-bipyridylium,
1-methyl-1′-(γ-hydroxypropyl)-4,4′-bipyridylium,
1-methyl-1′-acetonyl-4,4′-bipyridylium,
1-methyl-1′-(N,N-dialkylcarbamoylmethyl) bipyridylium and
1-(β-hydroxyethyl)-1′-acetonyl-4,4′-bipyridylium quaternary salts and
1-(N,N-dialkylcarbamoylmethyl)-1′-(N,N-dialkylcarbamoylmethyl)-4,4′-bipyridylium quaternary salts in which the two N,N-dialkylcarbamoylmethyl groups are different from each other.

The anion of the compounds of the invention can be a monovalent ion, for example a chloride, bromide or methosulphate ion, or a divalent ion in which instance of course the symbol $2X^-$ in the above structural formulae represents a single ion rather than two monovalent ions.

The choice of anion depends to a large extent upon the solubility of the respective salts in water and upon the ease with which the salts can be obtained.

The compounds of the invention show herbicidal activity together with the valuable property of being de-activated when they come into contact with soil. Thus the invention also consists in herbicidal compositions comprising as active ingredient a 4,4′-bipyridylium quaternary salt of the invention and a suitable diluent for the active ingredient. The compositions can be, for example, liquid compositions in which the active ingredient is in solution or dispersion in water or a suitable organic solvent. The compositions can alternatively be powder compositions in which the diluent is a suitable finely-divided substance, for instance china clay or talc. The ingredients used with the active ingredient in the herbicidal compositions of this invention can be substances known to the art as being suitable in the formulation of herbicidal compositions, for instance surface active substances such as wetting and dispersing agents, binders, stickers, corrosion inhibitors, stabilising agents and colouring agents.

Any wetting or dispersing agent used in the herbicidal compositions should preferably be a non-ionic surface-active compound, for instance an ethylene oxide-nonyl phenol condensate or a cationic compound, so as to avoid any undesirable interaction between the surface-active compound and the bipyridylium salt which might take place if an anionic compound were to be used as surface active compound. Similarly, any other adjuvant used in the herbicidal compositions should preferably not be a substance which would react undesirably with the active ingredient.

The invention also consists in a method of killing desiccating or severely damaging vegetation, in which the vegetation is treated with an effective amount of a 4,4′ bipyridylium quaternary salt or herbicidal composition of this invention.

The invention is illustrated by the following examples

Example 1

This example describes the preparation of 1-methyl-1′ benzyl 4,4′-bipyridylium dibromide.

1-methyl-4(4′-pyridyl)pyridinium monobromide (5 g. was heated at 95–110° C. for 5 minutes in excess benzyl bromide (30 ml.). The yellow solid which precipitate was removed by filtration and washed on the filter with absolute ethanol leaving 1-methyl-1′-benzyl-4,4′-bipyridylium dibromide as a residue having a melting point c 268–70° C. (with decomposition). A portion of this proc uct was recrystallised from a 3:1 by volume mixture c methanol and ethanol yielding a purified substance havin a melting point of 279–80° C. (with decomposition).

Examples 2–12

A number of other 1,1′-disubstituted-4,4′ bipyridyliu quaternary salts have been prepared by the general pro ess described in Example 1 above, but using an appr priate quaternising agent in each instance, instead of th benzyl bromide of that example.

These other salts, which are set out in the Table I belo as Examples 2–12 are all believed to have the gener formula:

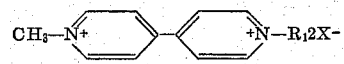

where $R_1$ is a substituted alkyl radical, and $X^-$ is a halid

TABLE I

| Example No. | R₁ | X⁻ | M.P. (decomp.) (° C.) |
|---|---|---|---|
| | Br—⟨phenyl⟩—CH₂— | Br | 264–6 |
| | ⟨phenyl with O₂N⟩—CH₂— | Br | 272–3 |
| | C₆H₅—CH₂—CH₂— | Br | 262–4 |
| | HO—CH₂—CH₂— | Cl | 256 |
| | O₂N—⟨phenyl⟩—CO—CH₂— | Br | 264–6 |
| | (C₂H₅)₂N—CO—CH₂— | Cl | 268 |
| | CH₃—CO—CH₂— | Cl | 278–80 |
| | ⟨phenyl⟩—CH₂— | Cl | 262–4 |
| )_ | HO—CH₂—CH₂—CH₂— | Cl | 256–8 |
| l_ | CH₃—CO—CH₂— | I | |
| ?_ | C₂H₅O—CO—CH₂— | I | 218–20 |

Example 13

This example discribes the preparation of 1-(β-hydroxyethyl)-1′-acetonyl-4,4′-bipyridylium dichloride.

1-(β-Hydroxyethyl)-4-(4′-pyridyl) pyridinium chloride 4.7 g.) and chloro-acetone (5 g.) were dissolved in butyl lcohol (40 ml.) and the solution was heated under reflux or 3 hours. The reaction mixture was cooled and the recipitate which had formed during the reaction was reıoved by filtration, washed well with ethanol, yielding - (β - hydroxyethyl) - 1′ - acetonyl - 4,4′ - bipyridylium ichloride. Recrystallisation of this product twice from hanol yielded a sample, M.P. 250–1° C. (decomp.).

The 1 - (β - hydroxyethyl) - 4 - (4′ - pyridyl) pyridinım chloride used as starting material in the process de- :ribed immediately above had been obtained as follows: ,4′-bipyridyl (7.8 g.) and ethylene chlorohydrin (6.6 ml. 'ere dissolved in butyl alcohol (50 ml.) and the resulting ɔlution was heated under reflux for 10 hours. The re- :tion mixture was then filtered while hot to remove a nall amount of solid which on chromatographic analysis ·as shown to be 1,1′-bis(β-hydroxyethyl)-4,4′-bipyridylım dichloride. The desired monoquaternary salt was ob- ıined by precipitation from the cooled filtrate using a ıixture of acetone and ether. The precipitate was washed ith acetone yielding 1-(β-hydroxyethyl)-4-(4′-pyridyl) yridinium chloride M.P. 157–160° C.

Examples 14–18

Five further bipyridylium salts have been made by the :ocess of Example 13, but using benzyl chloride, ethyl ıloracetate, N,N-diethyl chloracetamide, n-butyl bro- ıide and n-tetradecyl bromide respectively as quaternis- g agent, instead of the chloro-acetone of Example 13. The products thus obtained, which are set out in Table below as Examples 14–18, are all believed to have ructures according to the formula:

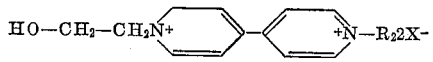

here R₂ is a substituted methyl radical or an alkyl radi- ıl and X⁻ is a halide ion, and are identified in Table II y the values given to R₂ and X⁻.

TABLE II

| Example No. | R₂ | X⁻ | M.P. (decomp.) (° C.) |
|---|---|---|---|
| 14 | C₆H₅—CH₂— | Cl | 220–2 |
| 15 | C₂H₅O.CO.CH₂— | Cl | 189–190 |
| 16 | (C₂H₅)₂N—CO—CH₂— | Cl | 242–4 |
| 17 | n C₄H₉— | Br | ¹ 200–202 |
| 18 | n C₁₄H₂₉— | Br | ¹ >320 |

¹ These compounds are believed to have been obtained as complexes with bromine.

Example 19

This example describes the preparation of 1-acetonyl-1′-benzyl-4,4′-bipyridylium dichloride.

1-acetonyl-4-(4′-pyridyl) pyridinium chloride (5 g.) and benzyl chloride (4.3 ml.) were dissolved in butyl alcohol (2 ml.) and the solution heated under reflux for 3 hours. The reaction mixture was cooled, and the precipitate which had formed during the reaction was removed by filtration and washed well with ethanol, yielding 1-acetonyl-1′-benzyl-4,4′-bipyridylium dichloride. Recrystallisation of this product twice from ethanol yielded a sample, M.P. 141–3° C. (decomp.).

The 1-acetonyl-4-(4′-pyridyl) pyridinium chloride used as starting material in the process described above in this example had been obtained as follows. 4,4-bipyridyl (5.2 g.) and chloroacetone (4.5 g.) were dissolved in ethanol (50 ml.) and the resulting solution was heated under reflux for 3 hours. The reaction mixture was then cooled and filtered to remove a small amount of solid which on chromatographic analysis was shown to be 1,1′-di-acetonyl-4,4′-bipyridylium dichloride, M.P. >300° C. (decomp.). The desired monoquaternary salt was obtained by precipitation from the filtrate by addition of a mixture of acetone and ether. The precipitate was washed with acetone yielding 1-acetonyl-4-(4′-pyridyl) pyridinium chloride M.P. 265–7° C. (decomp.).

Example 20–23

Four further bipyridylium salts have been prepared by the process of Example 19, but using N,N-diethyl chloracetamide, p-nitro-phenacyl bromide, p-methylphenacyl bromide and n-tetradecyl bromide respectively as quaternising agent instead of the benzyl chloride of Example 19. A further modification over the process of Example 19 was that in the processes using p-nitrophenacyl bromide and p-methylphenacyl bromide, amyl alcohol was used as solvent instead of butyl alcohol.

The products thus obtained, set out below in Table III as Examples 20–23, are all believed to have structures according to the formula:

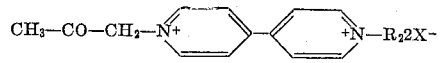

where R₂ is a substituted methyl radical or an alkyl radical and X⁻ is a halide ion, and are identified in Table III by the values given to R₂ and X⁻.

TABLE III

| Example No. | R₁ | X⁻ | M.P. (decomp.) (° C.) |
|---|---|---|---|
| 20 | (C₂H₅)₂N—CO—CH₂— | Cl | 236–7 |
| 21 | O₂N—⟨phenyl⟩—CO—CH₂— | Br | 273–5 |
| 22 | CH₃—⟨phenyl⟩—CO—CH₂— | Br | >300 |
| 23 | n C₁₄H₂₉— | Br | 234–6 |

Example 24

1-ethoxycarbonylmethyl-1'-p-methylphenacyl-4,4'-bipyridylium dibromide was made by a process similar to that of Example 13, but using as starting materials 1-ethoxycarbonylmethyl-4-(4'-pyridyl)pyridinium bromide (4.6 g.) and p-methylphenacyl bromide (4 g.) in amyl alcohol (75 ml.) and heating under reflux for one hour. The product thus obtained was a solid M.P. 240–1° C. (decomp.).

The 1-ethoxycarbonylmethyl-4-(4'-pyridyl) pyridinium bromide used as starting material in the process described above in this example had been obtained as follows. 4,4'-bipyridyl (50 g.) and ethyl chloroacetate (250 ml.) were mixed together and the mixture heated under reflux until it gently boiled, at which stage a solid immediately precipitated and the heating was discontinued and the mixture left to cool. The solid product was collected by filtration and washed well with acetone yielding 1-ethoxycarbonylmethyl-4-(4'-pyridyl)-pyridinium bromide as a solid, M.P. 265–7° C. (decomp.).

Examples 25–28

Four further bipyridylium salts have been prepared by the process of Example 24 but using p-nitrophenacyl bromide, n-butyl bromide, n-tetradecyl bromide and N,N-diethylchloroacetamide respectively as quaternising agents, instead of the p-methylphenacyl bromide of Example 24, and using butyl alcohol as the solvent.

The products thus obtained, which are set out in Table IV below as Examples 25–28, are believed to have structures corresponding to the formula:

where $R_2$ is an alkyl or substituted methyl radical and $X^-$ is a halide ion.

TABLE IV

| Example No. | $R_2$ | $X^-$ | M.P. (decomp.) (° C.) |
|---|---|---|---|
| 25 | $O_2N-\langle\rangle-CO-CH_2-$ | Br | 140–1 |
| 26 | n $C_4H_9-$ | Br | 233–5 |
| 27 | n $C_{14}H_{29}-$ | Br | 197–200 |
| 28 | $(C_2H_5)_2N-CO-CH_2-$ | Cl | 215–216 |

Example 29

1-(N,N-diethylcarbamoyl)methyl-1'-carboxymethyl-4,4'-bipyridylium dichloride has been prepared by heating together under reflux 1-(N,N-diethylcarbamoyl)methyl-4-(4'-pyridyl)pyridinium chloride (3 g.), with excess chloracetic acid (20 g.) for five minutes followed by cooling and filtration. The product was obtained as a solid which on recrystallisation from ethanol had M.P. 274° C. (decomp.).

The 1-(N,N-diethylcarbamoyl)methyl-4-(4'-pyridyl) pyridinium chloride used as starting material in the process described above in this example had been obtained as follows. 4,4'-bipyridyl (10.4 g.) and N,N-diethyl chloroacetamide (10 g.) were dissolved in actone (100 ml.). The resulting solution was heated under reflux for five hours, left to stand overnight and the solid product which had formed was collected by filtration. The solid on recrystallisation from a 1:10 mixture of ethanol and acetone was obtained as a solid, M.P. 260–4° C. (decomp.)

Example 30

1-(N,N-diethylcarbamoyl)methyl-1'-(N,N-di-isopropylcarbamoyl)methyl-4,4'-bipyridylium dichloride has been prepared by heating a solution of 1-(N,N-diethylcarbamyl)methyl-4-(4'-pyridyl)pyridinium chloride (2 g.) and N,N-di-isopropyl chloracetamide (1.65 g.) in di methylformamide (7.5 ml.) for 20 minutes at 140° C The reaction mixture was allowed to cool and diluted with acetone, and the solid thus precipitated was separated by filtration and recrystallized from a mixture of ethanol and acetone. The product obtained had M.P.> 330° C. (decomp.).

The substances obtained as products of Examples 1–30 have been found to show herbicidal activity against a range of representative broad-leawed plant species and grasses, when applied in the form of aqueous solutions containing as a non-ionic wetting agent 0.1% by weigh of a condensate of p-nonylphenol and ethylene oxide The substances obtained as products of Examples 5, 7, 8 10 and 30 have been found to be particularly effective the latter product showing a selective activity against broad-leafed weeds compared to its activity against grasses

What I claim is:

1. A 4,4'-bipyridylium quaternary salt of the formula:

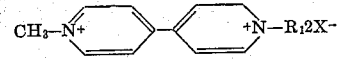

where $R_1$ is selected from the group consisting of benzy phenylalkyl, nitrobenzyl, bromobenzyl, nitrophenylcar bonylalkyl wherein the alkyl moiety in each instance a lower alkyl, and X is an anion.

2. A 1-methyl-1'-benzyl-4,4'-bipyridylium quaternar salt.

3. A 1-methyl-1'-(beta-phenylethyl)-4,4'-bipyridyliu quaternary salt.

4. A 1-methyl-1'-(meta-nitrobenzyl)-4,4'-bipyridyl um quaternary salt.

5. A 1-methyl-1'-(para-bromobenzyl)-4,4'-bipyridyl um quaternary salt.

6. A 1-methyl-1'-(para-nitrophenylcarbonylmethyl 4,4'-bipyridylium quaternary salt.

References Cited

UNITED STATES PATENTS

| | | | |
|---|---|---|---|
| 2,972,528 | 2/1961 | Brian et al. | |
| 3,020,143 | 2/1962 | Bluestone | 71—2 |
| 3,022,150 | 2/1962 | Weed | 71—2 |
| 3,040,052 | 6/1962 | Jubb | 260—2 |
| 3,049,547 | 8/1962 | Cislak | 260—294 |
| 3,054,798 | 9/1962 | Hickley et al. | 260—2 |

FOREIGN PATENTS 813,532   5/1959   Great Britain.

WALTER A. MODANCE, *Primary Examiner.*

DURAL T. McCUTCHEN, JOHN D. RANDOLPH,
*Examiners.*

R. T. BOND, *Assistant Examiner.*